(12) United States Patent
Bonnett

(10) Patent No.: US 8,625,747 B2
(45) Date of Patent: Jan. 7, 2014

(54) METHODS AND SYSTEMS FOR TESTING A GATEWAY DEVICE

(75) Inventor: Brian Bonnett, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1054 days.

(21) Appl. No.: 12/639,568

(22) Filed: Dec. 16, 2009

(65) Prior Publication Data
US 2011/0142205 A1    Jun. 16, 2011

(51) Int. Cl.
*H04M 1/24* (2006.01)

(52) U.S. Cl.
USPC ........................................ 379/26.01; 370/466

(58) Field of Classification Search
USPC .................. 379/1.01, 2, 10.01, 12, 19, 26.01, 379/27.01, 27.03, 27.04; 370/352–356, 370/401, 466, 467, 481
See application file for complete search history.

(56) References Cited

U.S. PATENT DOCUMENTS

| | | | |
|---|---|---|---|
| 5,706,328 A * | 1/1998 | Williman | 379/15.03 |
| 6,842,447 B1 * | 1/2005 | Cannon | 370/352 |
| 7,336,668 B2 * | 2/2008 | Adams | 370/396 |
| 7,486,665 B2 * | 2/2009 | Mekala et al. | 370/352 |
| 8,165,110 B1 * | 4/2012 | Ehlinger | 370/352 |
| 2002/0067713 A1 * | 6/2002 | D'Apuzzo | 370/352 |
| 2002/0101854 A1 * | 8/2002 | Siegrist et al. | 370/352 |
| 2004/0156484 A1 * | 8/2004 | Amin | 379/88.14 |
| 2009/0161565 A1 * | 6/2009 | Reniere et al. | 370/249 |
| 2012/0106718 A1 * | 5/2012 | Redmond et al. | 379/93.01 |

* cited by examiner

*Primary Examiner* — Md S Elahee
*Assistant Examiner* — Akelow Teshale

(57) ABSTRACT

An exemplary method includes generating a digit map in response to user input received by way of a graphical user interface, the digit map defining a digit sequence and a plurality of dual-tone multi-frequency ("DTMF") properties associated with each digit included in the digit sequence, generating DTMF tones representing the digit sequence in accordance with the DTMF properties, transmitting the DTMF tones to a gateway device communicatively coupled to the testing subsystem, the gateway device configured to translate the DTMF tones into a packet-based representation of the digit sequence and the DTMF properties, receiving the packet-based representation of the digit sequence and the DTMF properties from the gateway device, and determining whether the digit sequence and the DTMF properties included in the packet-based representation substantially match the digit sequence and the DTMF properties defined by the digit map. Corresponding methods and systems are also disclosed.

25 Claims, 8 Drawing Sheets

Test Results for DigitMap1

| Transmitted | | | Digit | Received | | | Pass/ Fail |
|---|---|---|---|---|---|---|---|
| Duration (ms) | Inter-Digit Delay (ms) | Amplitude (dB) | | Duration (ms) | Inter-Digit Delay (ms) | Amplitude (dB) | |
| 5000 | 5000 | -7.00 | 9 | 4953 | 5010 | -6.75 | Pass |
| 1000 | 1000 | -6.00 | 8 | 750 | 997 | -7.10 | Fail |
| 2000 | 3000 | -9.00 | 7 | 1999 | 3000 | -8.51 | Pass |

[ Export ] [ Retest ] [ OK ] [ Cancel ]

Fig. 6

METHODS AND SYSTEMS FOR TESTING A GATEWAY DEVICE

BACKGROUND INFORMATION

Traditional telephony devices utilize dual-tone multi-frequency ("DTMF") signaling (also referred to as touch-tone dialing) to establish telephone call connections and perform other functions after a connection is established. With DTMF, each key or digit that is pressed on a telephone generates two tones of specific frequencies. These tones are pulse code modulated and transmitted by way of a public-switched telephone network ("PSTN") to a receiving telephony device. The receiving telephony device may then demodulate the received pulse code modulated tones to determine which keys were pressed.

However, with the advent of the Internet, voice communications are increasingly being transported over IP networks such as the Internet and other packet-switched networks. To this end, numerous types of Voice over Internet Protocol ("VoIP") telephony devices have been developed that are configured to transmit and receive packet-based communications instead of DTMF tones. For example, many VoIP telephony devices are configured to send and receive packet-based representations of digits that have been encoded in accordance with a standard known as RFC2833.

To facilitate communication between traditional analog telephony devices and VoIP telephony devices, one or more gateway devices may be provided that translate DTMF tones into packet-based representations and vice versa. For example, DTMF tones representative of a digit sequence that are generated by an analog telephony device may be routed through a gateway device, which translates the DTMF tones into a packet-based representation of the digit sequence that may be received by a VoIP telephony device. The gateway device may similarly translate a packet-based representation of a digit sequence into DTMF tones that may be received by an analog telephony device.

It has been found that some gateway devices do not accurately translate DTMF tones into packet-based representations and vice versa. For example, some gateway devices do not function properly when deployed within a network environment associated with a particular service provider. Hence, it is often desirable to test gateway devices before they are deployed.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 6 illustrates an exemplary test results GUI according to principles described herein.

DETAILED DESCRIPTION OF PREFERRED EMBODIMENTS

Figure 1:
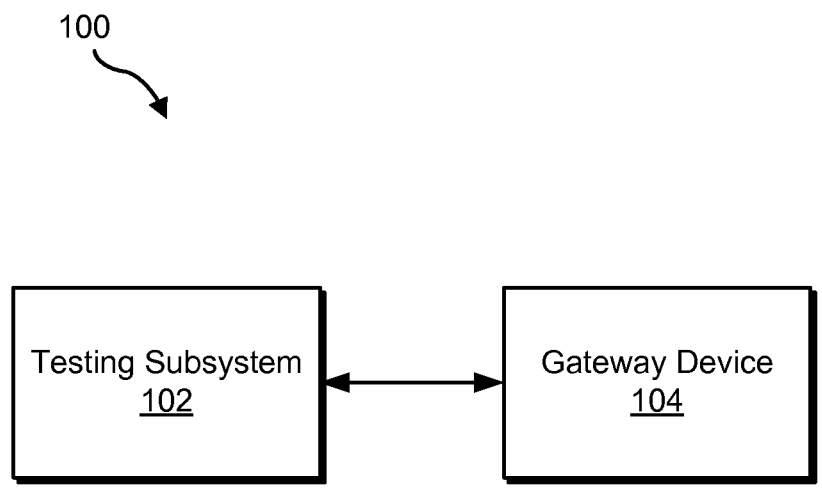
FIG. 1 illustrates an exemplary gateway device testing system according to principles described herein.

Methods and systems for testing a gateway device are described herein. For example, a gateway device under test may be selectively and communicatively coupled to a testing subsystem. The testing subsystem may generate a digit map in response to user input received by way of a graphical user interface. The digit map defines a digit sequence and a plurality of dual-tone multi-frequency ("DTMF") properties associated with each digit included in the digit sequence. The testing subsystem may further generate DTMF tones representing the digit sequence in accordance with the DTMF properties and transmit the DTMF tones to the gateway device under test, which translates the DTMF tones into a packet-based representation of the digit sequence and the DTMF properties. The testing subsystem may receive the packet-based representation of the digit sequence and the DTMF properties from the gateway device and determine whether the digit sequence and the DTMF properties included in the packet-based representation substantially match (e.g., are within an acceptable range of) the digit sequence and the DTMF properties defined by the digit map.

As will be described in more detail below, the testing subsystem may be additionally or alternatively configured to generate a digit map, generate a packet-based representation of the digit sequence and the DTMF properties defined in the digit map, and transmit the packet-based representation to the gateway device under test, which translates the packet-based representation into DTMF tones representing the digit sequence. The testing subsystem may receive the DTMF tones from the gateway device, measure a plurality of DTMF properties of the DTMF tones, and determine whether the measured DTMF properties substantially match the DTMF properties defined by the digit map.

As used herein, each "digit" included within a digit sequence defined by the digit map may be associated with a key that may be pressed on an analog telephony device by a user. For example, a digit may be associated with a number key having a value between 0 and 9, the "*" key, the "#" key, and/or any other key that may be a part of an analog telephony device. A digit may additionally or alternatively be associated with any other telephony event that may be generated and transmitted by an analog telephony device. For example, a digit may be associated with a dial tone.

As used herein, a "DTMF property" associated with a digit specifies a particular property of a DTMF signal generated by an analog telephony device in order to transmit the digit. Exemplary DTMF properties associated with a digit include, but are not limited to, a duration associated with the digit, an inter-digit delay associated with the digit, and an amplitude associated with the digit. Each of these DTMF properties will be described in more detail below.

As used herein, a "packet-based representation" of a digit sequence and its corresponding DTMF properties refers to any packet-based format in which the digit sequence and values representative of the DTMF properties may be encoded. An exemplary packet-based format that may be used to encode a digit sequence and a plurality of DTMF properties is known as RFC2833. In RFC2833, DTMF digits and DTMF properties associated with the digits are encoded as packets that may be transported by way of any suitable packet-based communication protocol (e.g., real-time transport protocol ("RTP")). Other packet-based formats may be used to encode a digit sequence and DTMF properties as may serve a particular application.

The methods and systems described herein facilitate testing of a gateway device before it is deployed in a particular network environment, which may be specific to a particular service provider. In this manner, it may be determined whether the gateway device is suitable for the particular network environment. The methods and systems may further facilitate testing of a gateway device after it has been deployed in a particular network environment. For example, the methods and systems described herein may be utilized to troubleshoot and/or otherwise test a particular gateway device that may not be accurately translating DTMF tones to packet-based representations and/or vice versa.

FIG. 1 illustrates an exemplary gateway device testing system 100 (or simply "system 100"). As shown in FIG. 1, system 100 may include a testing subsystem 102 and a gateway device 104 configured to communicate with one another. Testing subsystem 102 may be configured to test gateway device 104 to determine whether gateway device 104 accurately translates DTMF tones to packet-based representations and vice versa. Gateway device 104 may include a gateway device under test (i.e., located in or otherwise communicatively connected to a testing environment).

Testing subsystem 102 and gateway device 104 may communicate using any communication platforms and technologies suitable for transporting data, including known communication technologies, devices, media, and protocols supportive of remote or local data communications. Examples of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Real-time Transport Protocol ("RTP"), pulse code modulation ("PCM"), Ethernet, and any other suitable communications technologies, devices, media, and protocols.

In some examples, testing subsystem 102 and gateway device 104 may communicate via one or more networks, including, but not limited to, public-switched telephone networks ("PSTN"), the Internet, intranets, wireless networks, broadband networks, closed media networks, cable networks, satellite networks, local area networks, public networks, private networks, optical fiber networks, and/or any other networks capable of carrying data and communications signals between testing subsystem 102 and gateway device 104. Alternatively, testing subsystem 102 and gateway device 104 may communication directly without the use of a network.

Figure 2:
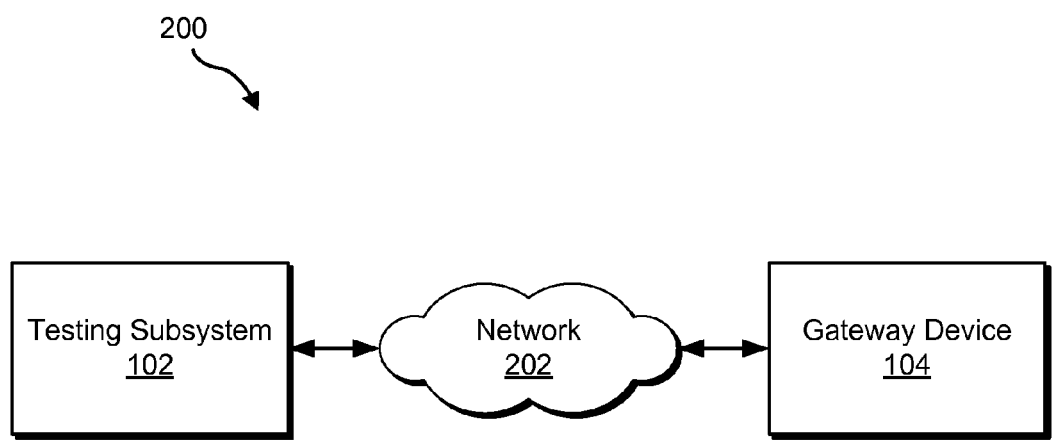
FIG. 2 shows an exemplary implementation of the system of FIG. 1 according to principles described herein.

FIG. 2 shows an exemplary implementation 200 of system 100 wherein testing subsystem 102 and gateway device 104 are communicatively coupled one to another via a network 202. Network 202 may include one or more networks, including, but not limited to, any of the networks listed above. Communications between testing subsystem 102 and gateway device 104 may be transported using any one of above-listed networks, or any combination or sub-combination of the above-listed networks. In some examples, testing subsystem 102 may be implemented at least in part on one or more servers or other network-enabled devices.

Figure 3:
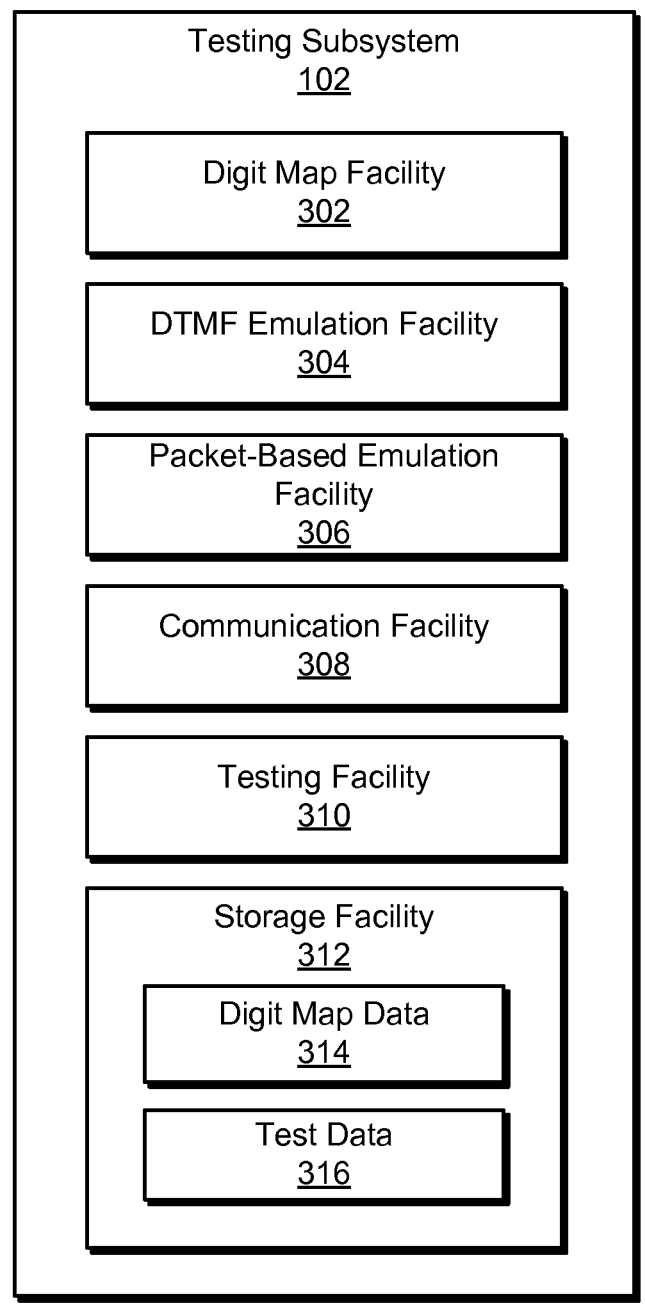
FIG. 3 illustrates exemplary components of a testing subsystem according to principles described herein.

FIG. 3 illustrates exemplary components of testing subsystem 102. As shown in FIG. 3, testing subsystem 102 may include a digit map facility 302, a DTMF emulation facility 304, a packet-based emulation facility 306, a communication facility 308, a testing facility 310, and a storage facility 312, which may be in communication with one another using any suitable communication technologies. It will be recognized that although facilities 302-312 are shown to be separate facilities in FIG. 3, any of those facilities may be combined into a single facility as may serve a particular application.

Digit map facility 302 may be configured to generate a digit map in response to user input received by way of a graphical user interface. To this end, digit map facility 302 may be further configured to generate and display the graphical user interface. As mentioned, a digit map defines a digit sequence that may be transmitted to gateway device 104 in order to determine whether gateway device 104 can accurately translate the digit sequence from one type of representation to another (e.g., from DTMF tones to a packet-based representation or vice versa).

The digit map generated by digit map facility 302 is further configured to define a plurality of DTMF properties associated with each digit included in the digit sequence. Exemplary DTMF properties associated with a digit include, but are not limited to, a duration associated with the digit, an inter-digit delay associated with the digit, and an amplitude associated with the digit.

As used herein, a "duration" associated with a digit refers to a period of time during which one or more tones representative of the digit are played. For example, a duration associated with a digit may correspond to a length of time that a key associated with the digit is pressed by a user. It will be recognized that each digit in a particular digit sequence may have a different duration depending on how long the user presses each key associated with the digits.

An "inter-digit delay" associated with a digit refers to a period of time after which the digit is input and before a subsequent digit is input. For example, a user may press a key associated with a first digit (e.g., "1") and then wait 200 milliseconds before pressing a key associated with another digit (e.g., "2"). The 200 millisecond time period is referred to as the inter-digit delay associated with the first digit. It will be recognized that a last digit in a sequence of digits need not have an inter-digit delay associated therewith.

An "amplitude" of a digit refers to a peak amplitude of a sine wave (i.e., a tone) associated with the digit. Each digit in a particular digit sequence may have a distinct amplitude.

In some examples, the digit map generated by digit map facility 302 may further define a duration tolerance value, an inter-digit delay tolerance value, and an amplitude tolerance value associated with each digit in the digit sequence. Each of these tolerance values specifies an acceptable range within which a received DTMF property must fall compared to its corresponding DTMF property defined in the digit map in order for gateway device 104 to pass a translation test performed by testing subsystem 102. In other words, testing facility 310 may utilize the specified tolerance values to determine whether gateway device 104 has accurately translated a digit sequence defined by the digit map from one type of representation to another (e.g., from DTMF tones to a packet-based representation or vice versa).

In some examples, a user may utilize the graphical user interface generated and displayed by digit map facility 302 to specify one or more of the values defined by the digit map. For example, a user may specify the digits included within the digit sequence defined by the digit map, the DTMF properties associated with each of the digits, and the tolerance values associated with each of the DTMF properties. In some examples, one or more of the values defined by the digit map may not be specified by the user. In these cases, digit map facility 302 may automatically select a default value for each non-specified value.

DTMF emulation facility 304 may be configured to emulate a telephony device that transmits and receives DTMF tones (e.g., a legacy analog telephone). For example, as will be described in more detail below, DTMF emulation facility 304 may generate DTMF tones representing the digit sequence defined in the digit map generated by digit map facility 302 in accordance with the DTMF properties defined in the digit map. As will be described in more detail below, the DTMF tones may be transmitted to gateway device 104 in order to test one or more translation capabilities of gateway device 104.

Packet-based emulation facility 306 may be configured to emulate a telephony device that transmits and receives packet-based representations of digit sequences and DTMF properties associated with the digit sequences (e.g., a VoIP telephone). For example, packet-based emulation facility 306 may generate a packet-based representation of the digit sequence and the DTMF properties defined in the digit map generated by digit map facility 302. As will be described in more detail below, the packet-based representation may be transmitted to gateway device 104 in order to test one or more translation capabilities of gateway device 104.

Communication facility 308 may be configured to facilitate communication between testing subsystem 102 and gateway device 104. For example, communication facility 308 may be configured to transmit DTMF tones generated by DTMF emulation facility 304 to gateway device 104. Gateway device 104 may translate the DTMF tones into a packet-based representation of the digit sequence and the DTMF properties represented by the DTMF tones. Communication facility 308 may be further configured to receive the packet-based representation from gateway device 104. As will be described in more detail below, testing facility 310 may process the received packet-based representation to determine whether the digit sequence and the DTMF properties included in the packet-based representation substantially match the digit sequence and the DTMF properties defined by the digit map.

Additionally or alternatively, communication facility 308 may be configured to transmit the packet-based representation generated by packet-based emulation facility 306 to gateway device 104. Gateway device 104 may translate the packet-based representation into DTMF tones having the DTMF properties specified in the packet-based representation. Communication facility 308 may be further configured to receive the DTMF tones from gateway device 104. As will be described in more detail below, testing facility 310 may measure a plurality of DTMF properties of the received DTMF tones and determine whether the measured DTMF properties substantially match the DTMF properties defined by the digit map.

In some examples, as will be described in more detail below, communication facility 308 may selectively emulate one or more of an analog telephony device interface, a VoIP telephony device interface, and a network monitoring interface in order to selectively receive different types of communications.

Testing facility 310 may be configured to analyze communications received from gateway device 104 in order to determine whether gateway device 104 is accurately translating DTMF tones into packet-based representations and vice versa. For example, as mentioned, testing facility 310 may analyze a packet-based representation of a digit sequence and associated DTMF properties that is received from gateway device 104 to determine whether the digit sequence and the DTMF properties included in the packet-based representation substantially match the digit sequence and the DTMF properties defined by a digit map generated by digit map facility 302. Likewise, testing facility 310 may measure DTMF properties of DTMF tones transmitted by gateway device 104 to determine whether the measured DTMF properties substantially match the DTMF properties defined by the digit map. Exemplary testing heuristics that may be utilized by testing facility 310 will be described in more detail below.

Storage facility 312 may be configured to maintain digit map data 314 representative of a digit map generated by digit map facility 302, test data 316 representative of a result of one or more tests performed by testing facility 310, and/or any other data as may serve a particular application.

Figure 4:
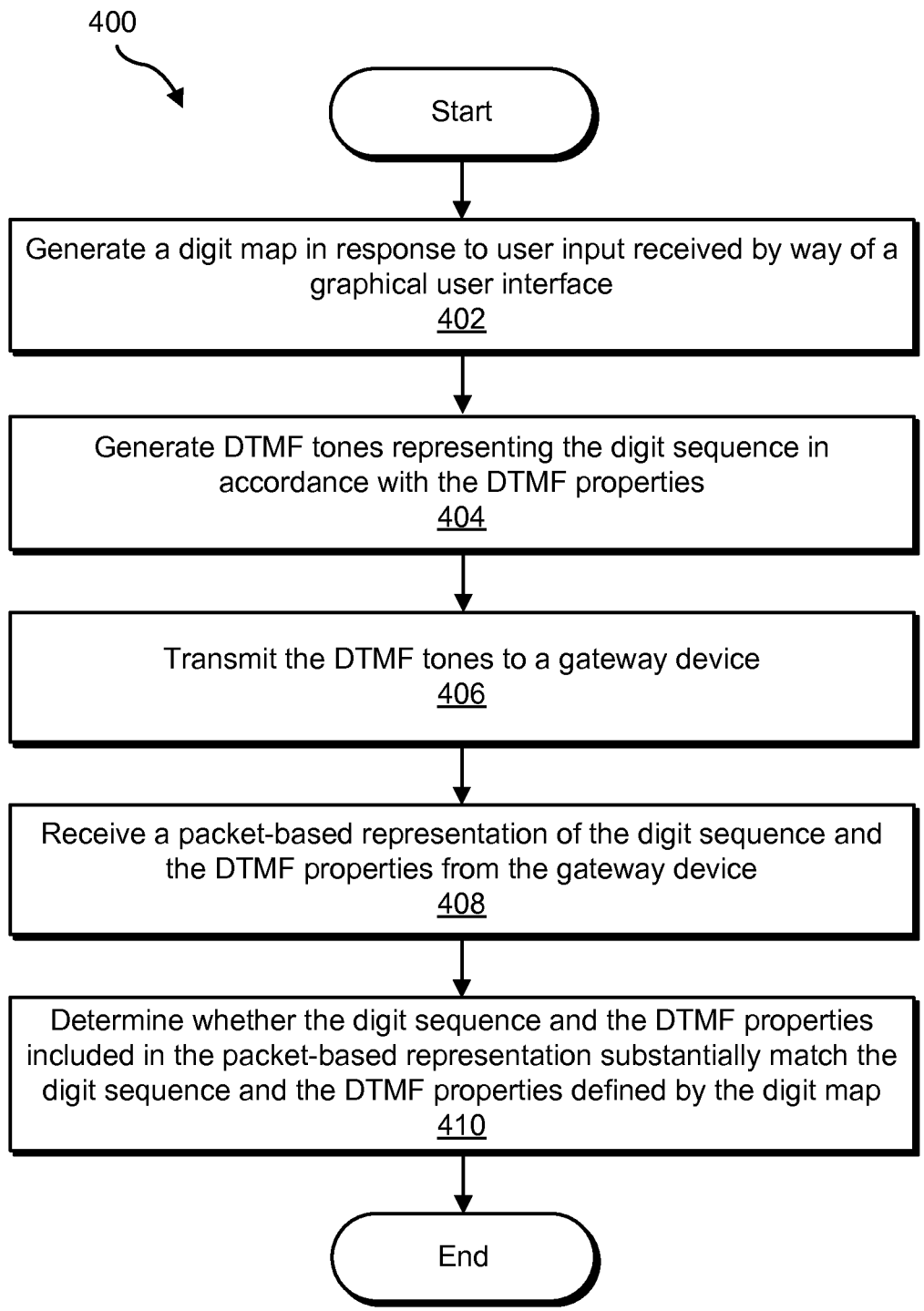
FIG. 4 illustrates an exemplary method of testing a gateway device according to principles described herein.

FIG. 4 illustrates an exemplary method 400 of testing a gateway device (e.g., gateway device 104). In particular, method 400 may be used to determine whether a gateway device accurately translates DTMF tones into a packet-based representation of a digit sequence and a plurality of DTMF properties represented by the DTMF tones. While FIG. 4 illustrates exemplary steps according to one embodiment, other embodiments may omit, add to, reorder, and/or modify any of the steps shown in FIG. 4. The steps shown in FIG. 4 may be performed by any component of testing subsystem 102.

In step 402, a digit map is generated in response to user input received by way of a graphical user interface. As described above, the digit map defines a digit sequence and a plurality of DTMF properties associated with each digit included in the digit sequence. The digit map may be generated by digit map facility 302, for example, in response to user input received by way of a graphical user interface displayed by digit map facility 302.

Figure 5:
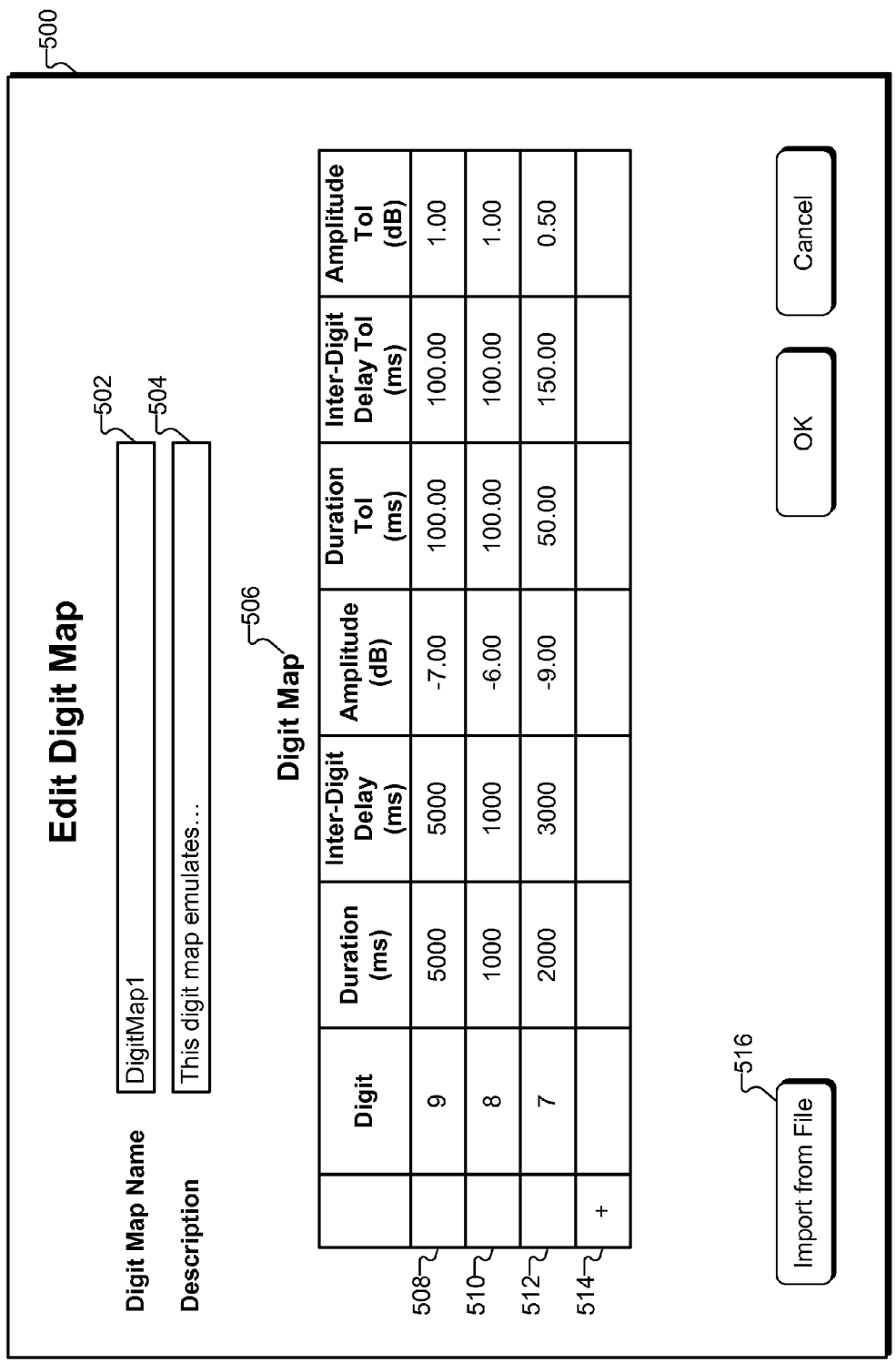
FIG. 5 shows an exemplary graphical user interface ("GUI") that may be generated and displayed in order to facilitate user creation of a digit map according to principles described herein.

FIG. 5 shows an exemplary graphical user interface ("GUI") 500 that may be generated and displayed by digit map facility 302 in order to facilitate user creation of a digit map. As shown in FIG. 5, GUI 500 may include various fields configured to receive user input associated with a digit map. For example, input field 502 may receive user input representative of a name of a particular digit map and input field 504 may receive user input representative of a description of the particular digit map. Additional or alternative fields associated with the digit map may be displayed in GUI 500 as may serve a particular implementation.

As shown in FIG. 5, GUI 500 may include a digit map table 506 configured to receive user input representative of a particular digit sequence and various DTMF properties associated with each digit in the digit sequence. It will be recognized that the various entries included in digit map table 506 are merely illustrative of the many different entries that may be included therein. As shown in FIG. 5, digit map table 506 includes a digit sequence comprising three digits: "9," "8," and "7." Each of these digits has been input by a user and has a plurality of user input DTMF properties associated therewith. For example, row 508 of digit map table 506 shows that the digit "9" has been defined to have a duration of 5000 milliseconds ("ms"), an inter-digit delay of 5000 ms, and an amplitude of −7.00 decibels ("dB"). Row 510 shows that the digit "8" has been defined to have a duration of 1000 ms, an inter-digit delay of 1000 ms, and an amplitude of −6.00 dB. Row 512 shows that the digit "7" has been defined to have a duration of 2000 ms, an inter-digit delay of 3000 ms, and an amplitude of −9.00 dB.

Each digit included in digit map table 506 also has an associated duration tolerance value, inter-digit delay tolerance value, and amplitude tolerance value. Each of these tolerance values may be specified by a user. For example, FIG. 5 shows that the digit "9" has been defined to have a duration tolerance value of 100 ms, an inter-digit delay tolerance value of 100 ms, and an amplitude tolerance value of 1.00 dB.

As shown in FIG. 5, each digit included in digit map table 506 may be represented by an actual numerical value. Additionally or alternatively, one or more frequency values associated with a digit may be used to represent a digit included in digit map table 506. To illustrate, frequency values of "350" and "440" may be input into a single field to represent a dial tone.

A user may add one or more digits and associated DTMF properties to digit map table 506 in order to include the one or more additional digits in the digit sequence defined by the digit map. For example, a user may enter values into row 514 of digit map table 506 in order to add another digit and associated DTMF properties to digit map table 506.

In some examples, a user may select an option (e.g., "Import from File" option 516) to import a digit sequence and/or DTMF properties from a file. In this manner, a user may load a predefined digit map into digit map table 506.

Returning to FIG. 4, in step 404, DTMF tones representing the digit sequence defined by the digit map are generated in accordance with the DTMF properties defined in the digit map. DTMF emulation facility 304 may generate DTMF tones representing the digit sequence in accordance with the DTMF properties in any suitable manner.

In step 406, the DTMF tones generated in step 404 are transmitted to a gateway device. For example, communication facility 308 of testing subsystem 102 may transmit the DTMF tones to gateway device 104. As described above, the gateway device is configured to translate the DTMF tones into a packet-based representation of the digit sequence and the DTMF properties associated with the DTMF tones.

In step 408, the packet-based representation generated by the gateway device is received from the gateway device. Communication facility 308 may receive the packet-based representation in suitable manner. For example, communication facility 308 may emulate a VoIP telephony device interface and receive and process the packet-based representation as would a VoIP telephony device. Additionally or alternatively, communication facility 308 may emulate a network monitoring interface (e.g., a packet sniffer) and intercept the packet-based representation along a transmission path of the packet-based representation.

In step 410, a determination is made whether the digit sequence and the DTMF properties included in the packet-based representation received in step 408 substantially match the digit sequence and the DTMF properties defined by the digit map generated in step 402. Testing facility 310 may perform the determination in any suitable manner.

For example, testing facility 310 may compare the digit sequence included in the received packet-based representation to the digit sequence defined by the digit map generated in step 402. If the digit sequences are identical, testing facility 310 may so indicate in a test results GUI (described below) and/or in any other manner. If the digit sequences are not identical, testing facility 310 may indicate that gateway device 104 has failed the translation test.

Testing facility 310 may additionally or alternatively be configured to compare the DTMF properties included in the received packet-based representation to the DTMF properties defined by the digit map. If each received DTMF property is within an acceptable range of its corresponding DTMF property defined in the digit map, testing facility 310 may indicate in the test results GUI and/or in any other manner that gateway device 104 has passed the translation test. The acceptable range is defined by one of the tolerance values in the digit map.

To illustrate, testing facility 310 may determine whether the DTMF properties of a received digit "9" match the DTMF properties associated with digit "9" included the digit map of FIG. 5. For example, testing facility 310 may determine that the received digit "9" has a duration of 4953 ms, an inter-digit delay of 5010 ms, and an amplitude of −6.75 dB. Testing facility 310 may then compare the received DTMF properties with those defined in the digit map. For example, testing facility 310 may determine that the received duration property is within 47 ms of the duration property defined in the digit map, the received inter-digit delay property is within 10 ms of the inter-digit delay property defined in the digit map, and that the received amplitude property is within 0.25 dB of the amplitude property defined in the digit map.

Once the differences between the received DTMF properties and the DTMF properties defined in the digit map have been determined, testing facility 310 may compare the differences to the tolerance values defined in the digit map to determine whether the received DTMF properties are within an acceptable range of their corresponding DTMF properties defined in the digit map. For example, if the duration tolerance is 100.00 ms, the inter-digit delay tolerance is 100.00 ms, and the amplitude tolerance is 1.00 dB, as shown in FIG. 5, testing facility 310 may indicate that each of the determined differences are within acceptable ranges of their corresponding DTMF properties defined in the digit map.

In some examples, testing facility 310 may be configured to generate and display a test results GUI configured to indicate one or more results of the comparisons performed by testing facility 310. In this manner, a user of testing subsystem 102 may readily determine whether gateway device 104 has accurately translated DTMF tones into a packet-based representation or vice versa.

FIG. 6 illustrates an exemplary test results GUI 600 that may be generated and displayed by testing facility 310. For illustrative purposes, test results GUI 600 corresponds to the digit sequence defined by digit map table 506 in GUI 500. As shown in FIG. 6, test results GUI 600 may display data representative of a digit sequence transmitted by testing subsystem 102 to gateway device 104 and a digit sequence received by testing subsystem 102 from gateway device 104. Test results GUI 600 may further display the DTMF properties associated with both the transmitted and received digit sequence. Test results GUI 600 may further indicate (i.e., in a pass/fail column 602) whether the received digit sequence and its associated DTMF properties substantially match the transmitted digit sequence and its associated DTMF properties. For example, test results GUI 600 indicates that digits "9" and "7" and their corresponding DTMF properties all passed the comparison test performed by testing facility 310 and that digit "8" did not pass the comparison test performed by testing facility 310. In particular, test results GUI 600 indicates that the "duration" and "amplitude" properties of the received digit "8" were not within an acceptable range of the "duration" and "amplitude" properties defined in digit map table 506.

In some examples, GUI 600 may include a selectable option (e.g., "export" option 604) configured to export the test results shown in test results GUI 600 to another format or program (e.g., to a spreadsheet format). Another option (e.g., "retest" option 606) may be selected to repeat the translation test.

Figure 7:
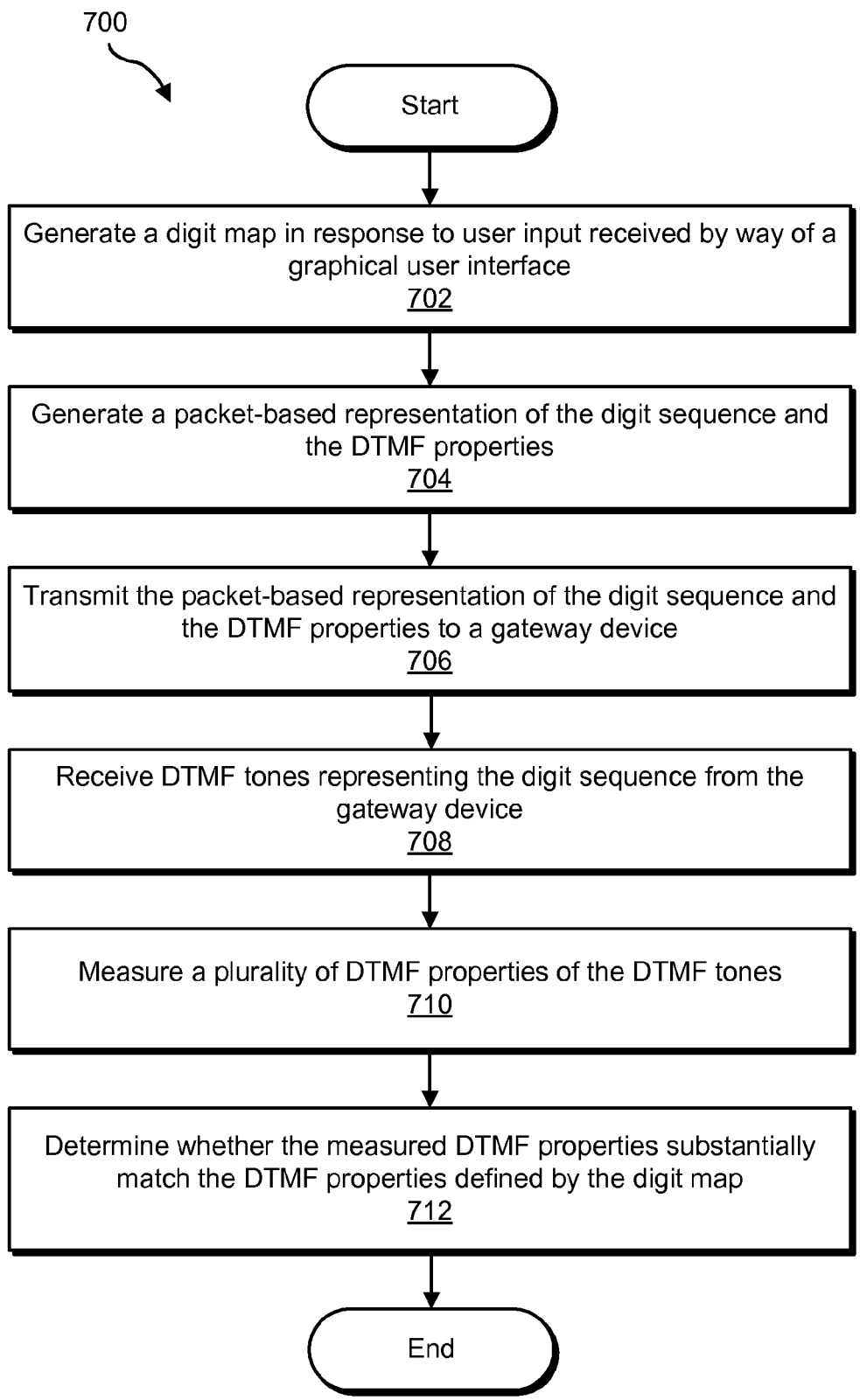
FIG. 7 illustrates another exemplary method of testing a gateway device according to principles described herein.

FIG. 7 illustrates another exemplary method 700 of testing a gateway device (e.g., gateway device 104). In particular, method 700 may be used to determine whether a gateway device accurately translates a packet-based representation of a digit sequence and corresponding DTMF properties to DTMF tones. While FIG. 7 illustrates exemplary steps according to one embodiment, other embodiments may omit, add to, reorder, and/or modify any of the steps shown in FIG. 7. The steps shown in FIG. 7 may be performed by any component(s) of testing subsystem 102.

In step 702, a digit map is generated in response to user input received by way of a graphical user interface. The digit map may be generated in any of the ways described herein. The graphical user interface may include any suitable graphical user interface (e.g., GUI 500).

In step 704, a packet-based representation of the digit sequence and the DTMF properties defined in the digit map generated in step 702 is generated. Packet-based emulation facility 306 may generate the packet-based representation in any suitable manner.

In step 706, the packet-based representation generated in step 704 is transmitted to a gateway device. For example, communication facility 308 may transmit the packet-based representation to gateway device 104. As described above, gateway device 104 may translate the packet-based representation into DTMF tones representing the digit sequence.

In step 708, the DTMF tones generated by the gateway device are received from the gateway device. Communication facility 308 may receive the DTMF tones generated by gateway device 104 in any of the ways described herein. For example, communication facility 308 may emulate an analog telephony device interface and receive and process the DTMF tones as would an analog telephony device.

In step 710, a plurality of DTMF properties of the DTMF tones received in step 708 are measured. For example, testing facility 310 may measure a duration of each digit included in the digit sequence, an inter-digit delay associated with each of the digits in the digit sequence, and an amplitude of each of the digits in the digit sequence.

In step 712, a determination is made whether the measured DTMF properties substantially match the DTMF properties defined by the digit map generated in step 702. Testing facility 310 may perform the determination in any suitable manner.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software), or combinations of computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

One or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Figure 8:
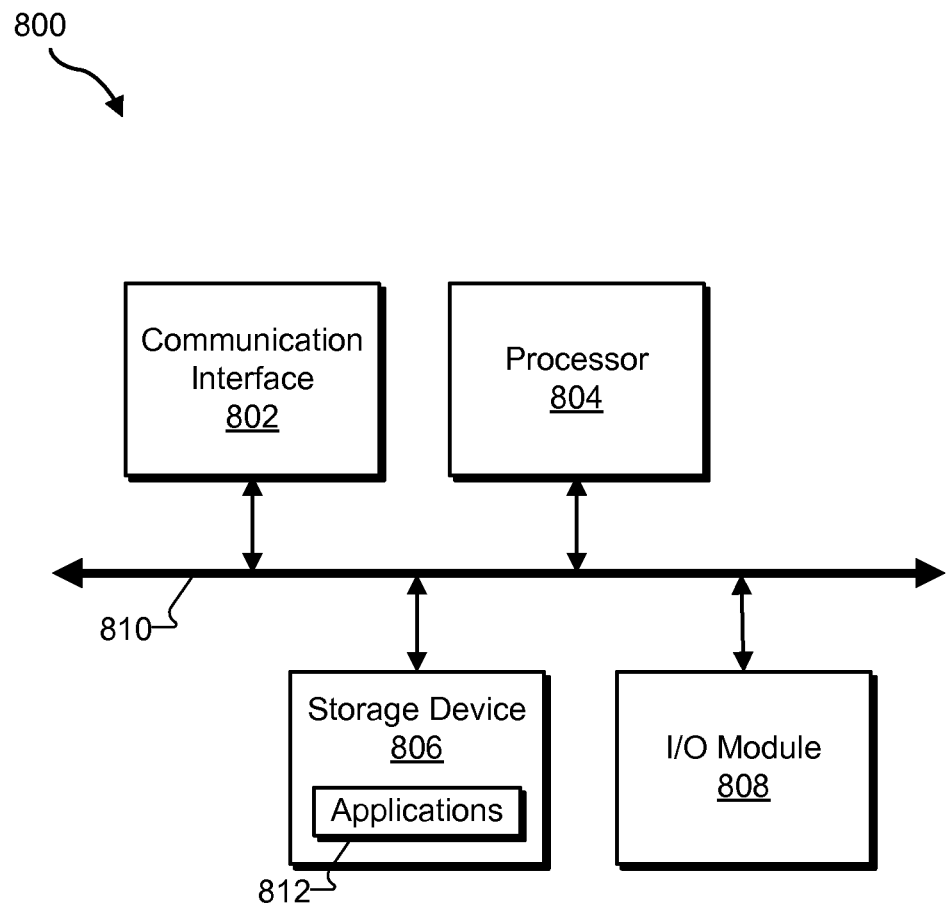
FIG. 8 illustrates an exemplary computing device according to principles described herein.

FIG. 8 illustrates an exemplary computing device 800 configured to perform one or more of the processes described herein. As shown in FIG. 8, computing device 800 may include a communication interface 802, a processor 804, a storage device 806, and an input/output ("I/O") module 808 communicatively connected via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, and any other suitable interface. In at least one embodiment, communication interface 802 may provide a direct connection between testing subsystem 102 and gateway device 104 via a direct link to a network, such as the Internet. Communication interface 802 may additionally or alternatively provide such a connection through, for example, a local area network (such as an Ethernet network), a personal area network, a telephone or cable network, a satellite data connection, a dedicated URL, or any other suitable connection. Communication interface 802 may be configured to interface with any suitable communication media, protocols, and formats, including any of those mentioned above.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 806. For example, data representative of one or more executable applications 812 (which may include, but are not limited to, one or more of the software applications described herein) configured to direct processor 804 to perform any of the operations described herein may be stored within storage device 806. In some examples, data may be arranged in one or more databases residing within storage device 806.

I/O module 808 may be configured to receive user input and provide user output and may include any hardware, firmware, software, or combination thereof supportive of input and output capabilities. For example, I/O module 808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 808 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   generating, by a testing subsystem, a digit map in response to user input received by way of a graphical user interface, the digit map defining a digit sequence and a plurality of dual-tone multi-frequency ("DTMF") properties associated with each digit included in the digit sequence;
   generating, by the testing subsystem, DTMF tones representing the digit sequence in accordance with the DTMF properties;
   transmitting, by the testing subsystem, the DTMF tones to a gateway device communicatively coupled to the testing subsystem, the gateway device configured to translate the DTMF tones into a packet-based representation of the digit sequence and the DTMF properties;
   receiving, by the testing subsystem, the packet-based representation of the digit sequence and the DTMF properties from the gateway device; and
   testing, by the testing subsystem, the gateway device to determine whether the gateway device accurately translates the DTMF tones to the packet-based representation by determining whether the digit sequence and the DTMF properties included in the packet-based representation substantially match the digit sequence and the DTMF properties defined by the digit map.

2. The method of claim 1, further comprising displaying, by the testing subsystem, a result of the determination in another graphical user interface.

3. The method of claim 1, wherein the plurality of DTMF properties defined by the digit map comprise a duration associated with each digit included in the digit sequence defined by the digit map.

4. The method of claim 3, wherein the digit map further defines a plurality of duration tolerance values associated with and specifying an acceptable range of durations for each of the digits included in the packet-based representation.

5. The method of claim 1, wherein the plurality of DTMF properties defined by the digit map comprise an inter-digit delay associated with one or more of the digits included in the digit sequence defined by the digit map.

6. The method of claim 5, wherein the digit map further defines a plurality of inter-digit delay tolerance values associated with and specifying an acceptable range of inter-digit delays for one or more of the digits included in the packet-based representation.

7. The method of claim 1, wherein the plurality of DTMF properties defined by the digit map comprise an amplitude associated with each digit included in the digit sequence defined by the digit map.

8. The method of claim 7, wherein the digit map further defines a plurality of amplitude tolerance values associated with and specifying an acceptable range of amplitudes for each of the digits included in the packet-based representation.

9. The method of claim 1, wherein each digit within the digit sequence and each of the DTMF properties are user-definable.

10. The method of claim 1, wherein the packet-based representation of the digit sequence and the DTMF properties comprises an RFC2833 encoded representation of the digit sequence and the DTMF properties.

11. The method of claim 1, embodied as computer-executable instructions on at least one tangible computer-readable medium.

12. A method comprising:
   generating, by a testing subsystem, a digit map in response to user input received by way of a graphical user interface, the digit map defining a digit sequence and a plurality of dual-tone multi-frequency ("DTMF") properties associated with each digit included in the digit sequence;
   generating, by the testing subsystem, a packet-based representation of the digit sequence and the DTMF properties;
   transmitting, by the testing subsystem, the packet-based representation of the digit sequence and the DTMF properties to a gateway device communicatively coupled to the testing subsystem, the gateway device configured to translate the packet-based representation into DTMF tones representing the digit sequence;
   receiving, by the testing subsystem, the DTMF tones from the gateway device;
   measuring, by the testing subsystem, a plurality of DTMF properties of the DTMF tones; and
   testing, by the testing subsystem, the gateway device to determine whether the gateway device accurately translates the packet-based representation into the DTMF tones by determining whether the measured DTMF properties substantially match the DTMF properties defined by the digit map.

13. The method of claim 12, further comprising determining, by the testing subsystem, whether the digit sequence represented by the DTMF tones matches the digit sequence defined by the digit map.

14. The method of claim 12, wherein the plurality of DTMF properties defined by the digit map comprise a duration, an inter-digit delay, and an amplitude associated with one or more of the digits included in the digit sequence defined by the digit map.

15. The method of claim 14, wherein the digit map further defines a plurality of duration tolerance values associated with and specifying an acceptable range of durations for each of the one or more digits represented by the DTMF tones.

16. The method of claim 14, wherein the digit map further defines a plurality of inter-digit delay tolerance values associated with and specifying an acceptable range of inter-digit delays for at least one of the one or more digits represented by the DTMF tones.

17. The method of claim 14, wherein the digit map further defines a plurality of amplitude tolerance values associated with and specifying an acceptable range of amplitudes for each of the one or more digits represented by the DTMF tones.

18. The method of claim 1, embodied as computer-executable instructions on at least one tangible computer-readable medium.

19. A system comprising:
a digit map facility configured to generate a digit map in response to user input received by way of a graphical user interface, the digit map defining a digit sequence and a plurality of dual-tone multi-frequency ("DTMF") properties associated with each digit included in the digit sequence;
a DTMF emulation facility communicatively coupled to the digit map facility and configured to generate DTMF tones representing the digit sequence in accordance with the DTMF properties;
a communication facility communicatively coupled to the DTMF emulation facility and configured to transmit the DTMF tones to a gateway device communicatively coupled to the system, the gateway device configured to translate the DTMF tones into a packet-based representation of the digit sequence and the DTMF properties, and
receive the packet-based representation of the digit sequence and the DTMF properties from the gateway device; and
a testing facility communicatively coupled to the communication facility and configured to test the gateway device to determine whether the gateway device accurately translates the DTMF tones to the packet-based representation by determining whether the digit sequence and the DTMF properties included in the packet-based representation substantially match the digit sequence and the DTMF properties defined by the digit map.

20. The system of claim 19, wherein the plurality of DTMF properties defined by the digit map comprise a duration, an inter-digit delay, and an amplitude associated with one or more of the digits included in the digit sequence defined by the digit map.

21. The system of claim 20, wherein the digit map further defines a plurality of duration tolerance values associated with and specifying an acceptable range of durations for each of the digits included in the packet-based representation.

22. The system of claim 20, wherein the digit map further defines a plurality of inter-digit delay tolerance values associated with and specifying an acceptable range of inter-digit delays for one or more of the digits included in the packet-based representation.

23. The system of claim 20, wherein the digit map further defines a plurality of amplitude tolerance values associated with and specifying an acceptable range of amplitudes for each of the digits included in the packet-based representation.

24. A system comprising:
a digit map facility configured to generate a digit map in response to user input received by way of a graphical user interface, the digit map defining a digit sequence and a plurality of dual-tone multi-frequency ("DTMF") properties associated with each digit included in the digit sequence;
a packet-based emulation facility communicatively coupled to the digit map facility and configured to generate a packet-based representation of the digit sequence and the DTMF properties;
a communication facility communicatively coupled to the packet-based emulation facility and configured to transmit the packet-based representation to a gateway device communicatively coupled to the system, the gateway device configured to translate the packet-based representation into DTMF tones representing the digit sequence, and
receive the DTMF tones from the gateway device; and
a testing facility communicatively coupled to the communication facility and configured to measure a plurality of DTMF properties of the DTMF tones, and
test the gateway device to determine whether the gateway device accurately
translates the packet-based representation into the DTMF tones by determining whether the measured DTMF properties substantially match the DTMF properties defined by the digit map.

25. The system of claim 24, wherein the testing facility is further configured to determine whether the digit sequence represented by the DTMF tones matches the digit sequence defined by the digit map.

\* \* \* \* \*